United States Patent
Stevens et al.

[11] Patent Number: 5,904,910
[45] Date of Patent: May 18, 1999

[54] METHOD FOR PRODUCING SULFUR AND HYDROGEN FROM A GASEOUS STREAM CONTAINING HYDROGEN SULFIDE AND AMMONIA

[75] Inventors: David K. Stevens, Stilwell, Kans.; James S. McCormick, Houston, Tex.

[73] Assignee: Black & Veatch Pritchard, Inc., Overland Park, Kans.

[21] Appl. No.: 08/965,898

[22] Filed: Nov. 7, 1997

[51] Int. Cl.[6] .......................... B01D 53/52; B01D 53/58; C01B 3/04
[52] U.S. Cl. ...................... 423/574.1; 423/237; 423/351; 423/644
[58] Field of Search .................... 423/237, 644, 423/648.1, 574.1, 351

[56] References Cited

U.S. PATENT DOCUMENTS

| | | | |
|---|---|---|---|
| 1,845,787 | 1/1932 | Dodge | 423/351 |
| 2,601,221 | 6/1952 | Rosenblatt et al. | 252/374 |
| 3,661,507 | 5/1972 | Breitback et al. | 23/2 R |
| 3,877,879 | 4/1975 | Palm et al. | 23/262 |
| 3,970,743 | 7/1976 | Beavon | 423/574 R |
| 4,003,978 | 1/1977 | Shiraishi et al. | 423/237 |
| 4,032,618 | 6/1977 | Matthews | 423/351 |
| 4,394,119 | 7/1983 | Waller et al. | 431/5 |
| 4,514,375 | 4/1985 | Laufhütte | 423/573 G |
| 4,596,699 | 6/1986 | Desgrandchamps et al. | 422/160 |
| 5,139,756 | 8/1992 | Shikada et al. | 423/237 |
| 5,139,764 | 8/1992 | Szekely | 423/574 R |
| 5,672,326 | 9/1997 | Minak et al. | 423/224 |

FOREIGN PATENT DOCUMENTS

| 50-1093 | 1/1975 | Japan | 423/574.1 |
|---|---|---|---|

OTHER PUBLICATIONS

Chandler "Getting more out of ammonia for less" *Process Engineering*, pp. 97–99, Oct. 1976.
Goar "Impure feeds cause Claus plant problems" Hydrocarbon Processing, pp. 129–132, Jul. 1974.

*Primary Examiner*—Gary P. Straub
*Assistant Examiner*—Timothy C. Vanoy
*Attorney, Agent, or Firm*—F. Lindsey Scott

[57] ABSTRACT

A method for producing hydrogen and sulfur from a first gaseous mixture containing hydrogen sulfide and ammonia by separating ammonia from the first gaseous mixture to produce a second gaseous mixture containing hydrogen sulfide; combusting a portion of the hydrogen sulfide in the second gaseous mixture to produce a third gaseous mixture containing hydrogen sulfide and sulfur dioxide; heating the ammonia to a temperature of at least 1800° F. to produce a fourth gaseous mixture containing nitrogen and hydrogen; and, combining the third gaseous mixture and the fourth gaseous mixture and passing the combined gaseous mixture to a sulfur recovery process wherein the hydrogen sulfide and sulfur dioxide are recovered as sulfur.

The ammonia may be partially oxidized by the use of substoichiometric amounts of oxygen or thermally dissociated.

16 Claims, 1 Drawing Sheet

METHOD FOR PRODUCING SULFUR AND HYDROGEN FROM A GASEOUS STREAM CONTAINING HYDROGEN SULFIDE AND AMMONIA

BACKGROUND OF THE INVENTION

1. Field of the Invention

This invention relates to a method for processing a hydrogen sulfide and ammonia mixture to produce hydrogen and sulfur.

2. Description of the Prior Art

In many industrial processes, streams of acid gases are produced. Streams commonly referred to as acid gas streams typically contain hydrogen sulfide and may contain other sulfur compounds. In many instances, these streams may also include ammonia.

Acid gas streams are typically processed in Claus units wherein the hydrogen sulfide is partially oxidized to produce a hydrogen sulfide/sulfur dioxide mixture in a proper ratio for reaction of the hydrogen sulfide and sulfur dioxide to produce elemental sulfur and water. As a first step in such Claus processes, the acid gas stream is burned to produce the desired quantity of sulfur dioxide in a burner system.

When substantial amounts of ammonia are present in the stream, the combustion of the mixed stream of hydrogen sulfide and ammonia in the burner system results in excessively high temperatures, i.e. as high as 2900° F. Desirably, the temperature in most burner systems is kept below 2800° F. and preferably below 2600° F. Further, the combustion of the ammonia and hydrogen sulfide in the burner system at the elevated temperatures results in the production of $NO_x$, sulfur trioxide, and related compounds. The $NO_x$ compounds are an undesirable environmental pollutant and their emission must be limited. The sulfur trioxide is a compound which condenses at relatively low temperatures and reacts readily with water to form an acid. This acid is extremely corrosive and may be damaging to downstream equipment which operates at a temperature below the condensation temperature of sulfur trioxide. Further, some of the sulfurous compounds are reactive with any unreacted ammonia to form sulfur-ammonia compounds which are also undesirable in the system which is designed to handle gaseous streams, except for the liquid sulfur stream typically recovered from a Claus unit.

It is immediately apparent that both the hydrogen sulfide and the ammonia contain large amounts of hydrogen which are desirably recovered. Accordingly, it is desirable that a process be available wherein the ammonia can be fully reacted to produce environmentally acceptable materials and hydrogen and wherein the sulfur can be combusted and passed to a Claus unit without the production of undesirable acids or solid materials as by-products.

SUMMARY OF THE INVENTION

According to the present invention, hydrogen and sulfur are produced from a first gaseous mixture containing hydrogen sulfide and ammonia by separating at least a major portion of the ammonia from the first gaseous mixture to produce a second gaseous mixture containing at least a major portion of the hydrogen sulfide; combusting a portion of the hydrogen sulfide in the second gaseous mixture to produce a third gaseous mixture containing hydrogen sulfide and sulfur dioxide in a selected ratio; heating the ammonia to a temperature sufficient to dissociate at least a portion of the ammonia to produce a fourth gaseous mixture containing nitrogen and hydrogen; and, combining the third gaseous mixture and the fourth gaseous mixture and passing the combined gaseous mixture to a sulfur recovery process wherein at least a major portion of the hydrogen sulfide and sulfur dioxide is recovered from the combined gaseous mixture as sulfur and the hydrogen is recovered in the combined gaseous mixture.

The ammonia may be partially oxidized by the use of substoichiometric amounts of oxygen or may be thermally dissociated.

The hydrogen-sulfide- and sulfur-dioxide-containing gaseous mixture may be combined with the nitrogen- and hydrogen-containing stream to form a combined stream which is then passed to a sulfur recovery process or, alternatively, the nitrogen- and hydrogen-containing stream may be passed to hydrogen recovery.

DESCRIPTION OF PREFERRED EMBODIMENTS

In the description of the Figures, the same numbers will be used throughout to refer to the same or similar components. The pumps, compressors, fans and the like necessary to achieve the desired flows have not been shown in the interest of conciseness.

Figure 1:
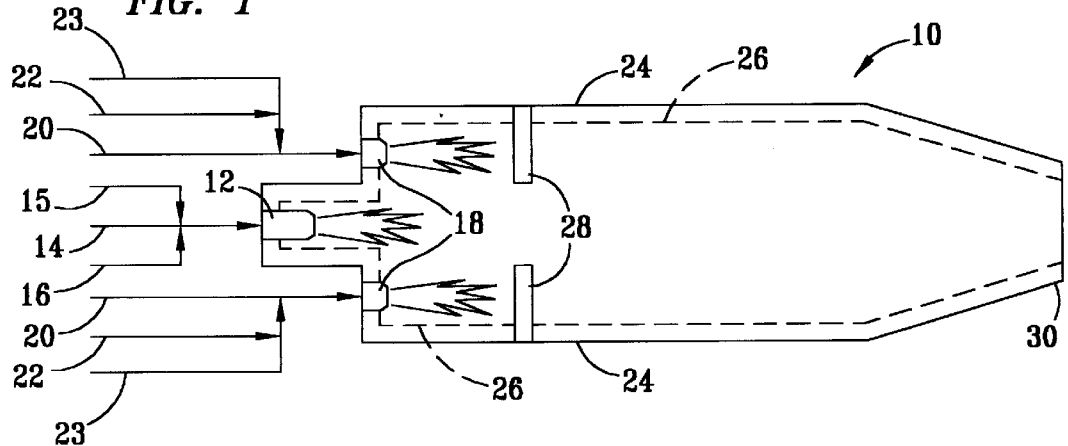
FIG. 1 is a schematic diagram of a suitable burner for use to combust or dissociate ammonia and to partially combust hydrogen sulfide in a single burner.

In FIG. 1, a burner assembly 10 is shown which includes an ammonia burner 12. Ammonia is supplied to burner 12 through an ammonia line 14 and oxygen is optionally supplied to burner 12 via a line 16. The ammonia supplied via line 14 may contain hydrocarbons, sulfur compounds, carbon dioxide, water and the like. Burner assembly 10 also includes a hydrogen sulfide burner 18 which is supplied with hydrogen sulfide via a line 20. The ammonia supplied via line 16 may contain hydrocarbons, other sulfur compounds, carbon dioxide, ammonia, water and the like. Oxygen is supplied to burner 18 through an oxygen line 22. Burner assembly 10 comprises an outer casing 24 which is of any suitable heat resistant material as known to those skilled in the art. Materials such as used for burner construction in Claus processes generally are considered suitable for the fabrication of burner assembly 10. Outer casing 24 is lined with a ceramic lining shown by dotted line 26. Burner assembly 10 also, optionally, includes a baffle 28 and a discharge outlet 30 for the discharge of the products of combustion and dissociation generated in burner assembly 10. It will be understood that burner assembly 10 may include a plurality of hydrogen sulfide burners and a plurality of ammonia burners as required to process the particular hydrogen sulfide/ammonia mixtures to be treated. Fuel gas may be supplied to burners 12 and 18 via lines 15 and 23 as required for temperature control. Fuels such as natural gas, hydrogen and the like may be used.

Figure 2:
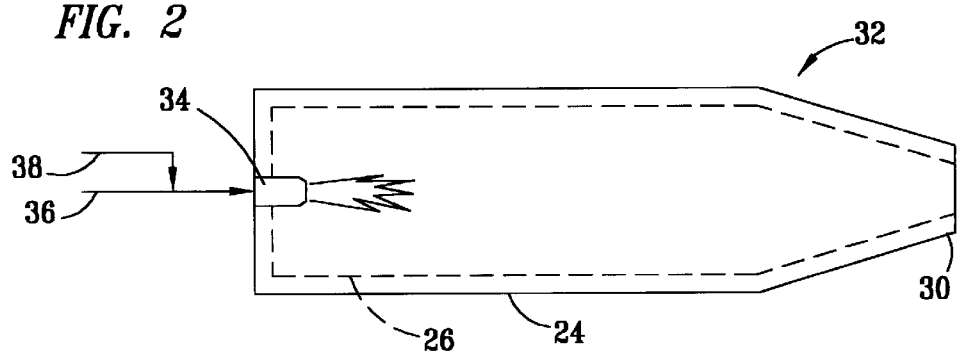
FIG. 2 is a schematic diagram of a single burner which can be used for the partial combustion of hydrogen sulfide or the partial combustion and dissociation of the ammonia; and, FIG. 3 is a schematic diagram of an embodiment of the method of the present invention wherein hydrogen sulfide is partially combusted in a separate burner and the ammonia is partially combusted and dissociated in a separate burner with the gaseous product streams being recovered separately or in combination.

FIG. 2 shows a single burner assembly 32 which includes a burner 34 which is supplied with a reactant via a line 36 and oxygen via a line 38. The gaseous products are discharged from burner assembly 32 via a discharge outlet 30.

Figure 3:
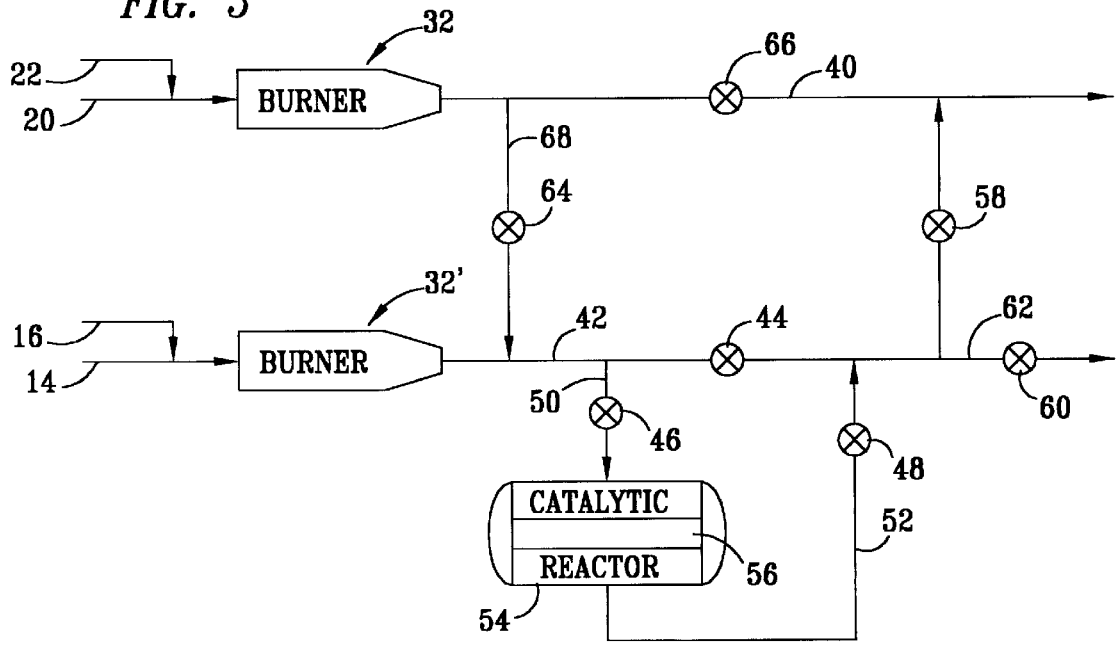

FIG. 3 shows an embodiment of a method of the present invention. Hydrogen sulfide is passed via a line 20 to a burner 32 of the type shown in FIG. 2 with oxygen being introduced via a line 22. The resulting combustion product stream containing hydrogen sulfide and sulfur dioxide in a controlled ratio, is discharged through a line 40 and may be passed to a Claus process or similar sulfur recovery process. A second burner 32' is shown and is supplied with ammonia via a line 14 and oxygen via a line 16. The resulting nitrogen, hydrogen, water and combustion and dissociation products are recovered through a line 42 and may be passed via a valve 44 and a valve 58 to combination with the hydrogen sulfide/sulfur dioxide mixture in line 40. the resulting mixture may then be passed to a Claus process or other sulfur recovery process.

Alternatively, if it is not necessary to treat the nitrogen/hydrogen stream in line 42 for the removal of sulfur, it may be passed through a line 62 and valve 60 to processing for the recovery of hydrogen.

Alternatively, the nitrogen/hydrogen stream in line 42 may be passed to a catalytic reactor 54 which includes a catalyst bed 56 which typically contains a suitable ammonia dissociation catalyst, such as a nickel catalyst, for the further dissociation of ammonia into nitrogen and hydrogen. The stream in line 42 is passed to catalytic reactor 54 via a line 50 by closing valve 44 and opening a valve 46 and a valve 48 in a recovery line 52.

Alternatively, if the stream in line 40 contains residual ammonia or nitrogen compounds the stream may be passed to line 42 via a line 68 by closing a valve 66 in line 40 and opening a valve 64 in line 68 so that the stream from line 40 is combined with the stream in line 42 and the combined stream is passed through catalytic reactor 54 as discussed above to further dissociate residual ammonia. Similarly, the gaseous stream produced in burner assembly 10 may also be passed through a catalytic reactor (not shown) to further dissociate ammonia in the gaseous stream if desired.

In the practice of the method of the present invention, the ammonia and hydrogen sulfide are separated prior to processing. Such separations are considered to be well known to those skilled in the art. As discussed previously, when the ammonia and hydrogen sulfide are combusted together, unacceptably high temperatures result and $NO_x$ and $SO_3$ compounds are formed. These materials are both undesirable products. By the process of the present invention, the separated hydrogen sulfide is partially oxidized to produce a reaction mixture for the Claus process which has a controlled hydrogen sulfide to sulfur dioxide ratio. These reactions are shown below as Equations 1 and 2.

$2H_2S+3O_2 \rightarrow 2SO_2+2H_2O$      Equation 1

$2H_2S+SO_2 \rightarrow 3S+2H_2O$      Equation 2

The ammonia can be combusted to produce nitrogen and water under suitable conditions as shown in Equation 3. This reaction, while effective to remove ammonia, is exothermic and contributes to the excessive heat in the burner assembly when hydrogen sulfide and ammonia are combusted together. It is preferable that the ammonia be decomposed by causing it to dissociate into ammonia and hydrogen. This dissociation can be achieved by heating the ammonia to a temperature of at least 1800° F. The dissociation reaction is shown below as Equation 4.

$4NH_3+3O_2 \rightarrow 2N_2+6H_2O$      Equation 3

$2NH_3 \rightarrow N_2+3H_2O$      Equation 4

By the method of the present invention, the ammonia and hydrogen sulfide may be charged to a burner assembly as shown in FIG. 1. In the embodiment shown in FIG. 1, the ammonia may be injected via burner 12 with no added oxygen. If the heat generated by the combustion of the hydrogen sulfide is sufficient to generate a temperature of at least 1800° F. in burner assembly 10 downstream from the burners, the ammonia may be dissociated according to Equation 4. This dissociation optimizes the formation of hydrogen which is a desirable product gas. In the event that insufficient heat is generated, amounts of oxygen less than the amount required to react with all of the ammonia to produce nitrogen and water may be charged through line 16. Desirably, the quantity of oxygen supplied is less than that required to react with all of the ammonia to oxidize it to nitrogen and water. The quantity of oxygen is desirably selected as that amount which is required to generate the required amount of heat by reaction as shown in Equation 3 to nitrogen and water. The remaining ammonia is thermally dissociated to produce nitrogen and hydrogen, as shown in Equation 4. In FIG. 1, the reaction streams from the ammonia combustion/dissociation burner and the mixture of hydrogen sulfide and sulfur dioxide from the hydrogen sulfide burners are mixed and discharged from burner assembly 10 via the discharge outlet 30. This mixture is then passed to a sulfur recovery unit, such as a Claus unit for treatment to remove the sulfur compounds as sulfur. The nitrogen and hydrogen are recovered from this process as a desulfurized gaseous mixture. The hydrogen may then be recovered or the combined stream may be passed to use as a hydrogen-containing stream.

While a particular burner configuration has been shown, it should be understood that any suitable burner configuration can be used and that any number of hydrogen sulfide burners and ammonia burners can be used as required to properly accommodate the gaseous volume of the respective streams.

In FIG. 2, a single burner is shown as a burner assembly 32 for the combustion of either a hydrogen sulfide stream or the combustion/dissociation of an ammonia stream. It will be understood that a number of burners could be used in the burner assembly 32. The use of a single burner as shown is intended to depict an apparatus which is suitably used for the combustion of the hydrogen sulfide or the combustion/dissociation of the ammonia in a single zone. In other words, burner assembly 32 can contain as many or as few burners as are required for the volume of the stream to be processed, but it is desirably used to process only hydrogen sulfide or only ammonia. The streams produced from burner assembly 32 are desirably passed to further processing as shown in FIG. 3.

In FIG. 3, a burner 32 is shown wherein hydrogen sulfide is combusted to produce a mixture of hydrogen sulfide and sulfur dioxide. The gaseous mixture so produced is passed through a line 40 and is desirably passed to a sulfur recovery process, such as a Claus process, or the like. In burner 32', an ammonia stream is processed by partial combustion and dissociation of the ammonia to produce a gaseous mixture which desirably contains nitrogen and hydrogen in line 42. The gaseous stream in line 42 may be passed directly to combination with the gaseous stream in line 40 by closing valves 46 and 48 and by closing a valve 60 in a line 62 and opening valves 44 and 58. Alternatively, if this stream does not require further treatment for the removal of sulfur compounds, it may be passed directly to a process for the recovery of hydrogen by closing valve 58 and opening valve 60. Alternatively, the gaseous stream in line 42 may be passed to a catalytic reactor 54 including a catalyst bed 56 via line 50. The stream is passed to catalytic reactor 54 by closing valve 44 and opening valves 46 and 48. The catalytic reactor contains an ammonia dissociation catalyst to complete the thermal dissociation of the ammonia if necessary. The resulting stream is then either passed to combination with the stream in line 40 or passed through line 62 to hydrogen recovery.

In the practice of the present invention, it has been found that by the use of substoichiometric quantities of oxygen, the ammonia is readily dissociated into a stream which contains nitrogen and hydrogen. The gaseous mixture will also contain water to the extent that the ammonia has been combusted to nitrogen and water, but desirably, by the use of substoichiometric quantities of oxygen, the ammonia is primarily thermally dissociated to produce nitrogen and hydrogen. When the nitrogen/hydrogen stream is produced in the same burner assembly as the hydrogen sulfide/sulfur dioxide stream, some portion of the hydrogen may be reacted with the sulfur dioxide to reduce it back to hydrogen sulfide. Accordingly, the composition of the gaseous mixture produced in the hydrogen sulfide burners may need to include slightly more sulfur dioxide than when no ammonia dissociation is practiced in the hydrogen sulfide burner. The composition of the gaseous mixture passed to the Claus process is readily adjusted as known to those skilled in the art by increasing the amount of combustion of hydrogen sulfide. The nitrogen and hydrogen typically pass through the Claus process without significant interaction with any of the reactant materials and are recovered in the discharge gaseous stream from the sulfur recovery process. As a result, the nitrogen and hydrogen are recovered as a desulfurized stream leaving the Claus process. Such streams are commonly referred to as tail gas streams and may require additional processing for the removal of residual quantities of sulfur compounds. Such processes typically include the use of amine scrubbers and the like.

The ammonia is suitably heated to a temperature sufficient to dissociate at least a portion of the ammonia to produce nitrogen and hydrogen. The temperature is suitably at least about 1800° F. and preferably at least about 2000° F. The ammonia dissociation temperature range is suitably from about 1800° F. to about 2900° F. and preferably from about 2000° F. to about 2400° F.

The oxygen used may be supplied as air, oxygen, oxygen-enriched air or the like as known to those skilled in the art. It has been found that the nitrogen/hydrogen stream emitted from the method of the present invention contains very low quantities of $NO_x$ and ammonia. This is a very desirable result in view of the undesirability of the $NO_x$ as an emitted gas and the formation of sulfur-ammonia compounds when unreacted ammonia is present downstream from the burners. The method of the present invention produces no significant amounts of sulfur trioxide or ammonium-sulfur compounds.

According to the present method, mixtures of hydrogen sulfide and ammonia are readily converted to sulfur and hydrogen by a process which generates substantially no or insignificant quantities of $NO_x$, $SO_3$, and ammonia-sulfur compounds. The ammonia is substantially completely eliminated and converted to nitrogen and hydrogen or water.

By the method of the present invention, an undesirable pollutant stream has been processed to produce desirable product streams without the generation of other undesirable by product streams.

Having thus described the invention by reference to certain of its preferred embodiments, it is respectfully pointed out that the embodiments described are illustrative rather than limiting in nature and that many variations and modifications are possible within the scope of the present invention.

Having thus described the invention, we claim:

1. A method for producing hydrogen and sulfur from a first gaseous mixture containing hydrogen sulfide and ammonia, the method consisting essentially of:
    a) separating at least a major portion of the ammonia from the first gaseous mixture to produce a second gaseous mixture containing at least a major portion of the hydrogen sulfide;
    b) combusting a portion of the hydrogen sulfide in the second gaseous mixture to produce a third gaseous mixture containing hydrogen sulfide and sulfur dioxide;
    c) heating the ammonia to a temperature sufficient to dissociate at least a major portion of the ammonia to produce a fourth gaseous mixture containing nitrogen and hydrogen; and
    d) combining the third gaseous mixture and the fourth gaseous mixture and passing the combined gaseous mixture to a sulfur recovery process wherein at least a major portion of the hydrogen sulfide and sulfur dioxide is recovered from the combined gaseous mixture as sulfur and wherein at least a portion of the hydrogen is recovered in the discharge gaseous stream from the sulfur recovery process.

2. The method of claim 1 wherein hydrogen sulfide and sulfur dioxide are present in the combined gaseous mixture in a controlled hydrogen sulfide:sulfur dioxide ratio for reaction in a Claus process.

3. The method of claim 1 wherein the ammonia is heated to at least about 1800° F. by mixture with the third gaseous mixture.

4. The method of claim 1 wherein the ammonia is heated by combusting a portion of the ammonia with an amount of oxygen less than the amount of oxygen required to combust all of the ammonia to nitrogen and water but sufficient to heat the uncombusted ammonia to a temperature of at least about 1800° F.

5. The method of claim 1 wherein the ammonia is heated to a temperature from about 1800° F. to about 2900° F.

6. The method of claim 1 wherein the ammonia is heated to a temperature from about 2000° F. to about 2400° F.

7. The method of claim 1 wherein the second gaseous mixture is combusted in a first burner positioned in a burner assembly to discharge the third gaseous mixture into a first zone.

8. The method of claim 7 wherein the ammonia is charged to the first zone.

9. The method of claim 7 wherein a portion of the ammonia is combusted in a second burner positioned in the burner assembly to discharge the fourth gaseous mixture into the first zone.

10. The method of claim 7 wherein a portion of the ammonia is combusted in a second burner and wherein the fourth gaseous mixture is discharged to a second zone.

11. The method of claim 1 wherein the fourth gaseous mixture is contacted with an ammonia dissociation catalyst.

12. The method of claim 1 wherein the ammonia is substantially eliminated and wherein substantially no $NO_x$, $SO_3$ and ammonia-sulfur compounds are produced.

13. A method for producing hydrogen and sulfur from a first gaseous mixture containing hydrogen sulfide and ammonia, the method consisting essentially of:

a) separating at least a major portion of the ammonia from the first gaseous mixture to produce a second gaseous mixture containing at least a major portion of the hydrogen sulfide;

b) combusting a portion of the hydrogen sulfide to produce a third gaseous mixture containing hydrogen sulfide and sulfur dioxide;

c) combusting a portion of the ammonia with an amount of oxygen less than the amount of oxygen required to oxidize all of the ammonia to nitrogen and water but sufficient to heat the uncombusted ammonia to a temperature of at least about 1800° F. and to dissociate a portion of the ammonia to produce a fourth gaseous mixture containing nitrogen and hydrogen; and d) combining the third gaseous mixture and the fourth gaseous mixture and passing the combined gaseous mixture to a sulfur recovery process.

14. The method of claim 13 wherein the hydrogen sulfide and sulfur dioxide are present in the combined gaseous mixture in a controlled hydrogen sulfide:sulfur dioxide ratio for reaction in a Claus process.

15. The method of claim 13 wherein the uncombusted ammonia is heated to a temperature from about 1800° F. to about 2900° F.

16. The method of claim 13 wherein the ammonia is substantially eliminated and wherein substantially no $NO_x$, $SO_3$ and ammonia-sulfur compounds are produced.

* * * * *

UNITED STATES PATENT AND TRADEMARK OFFICE
CERTIFICATE OF CORRECTION

PATENT NO. : 5,904,910
INVENTOR(S) : David K. Stevens, et. al.
DATED : May 18, 1999

It is certified that error appears in the above-identified patent and that said Letters Patent is hereby corrected as shown below:

Column 6:
Claim 9, line 55, change the word "bumer" to "burner".

Signed and Sealed this

Seventh Day of September, 1999

Q. TODD DICKINSON

Attest:

Attesting Officer

Acting Commissioner of Patents and Trademarks